April 14, 1925.
C. R. SCHMIDT
1,533,469
WATER CIRCULATING SYSTEM FOR AUTOMOBILE ENGINES
Filed May 11, 1923
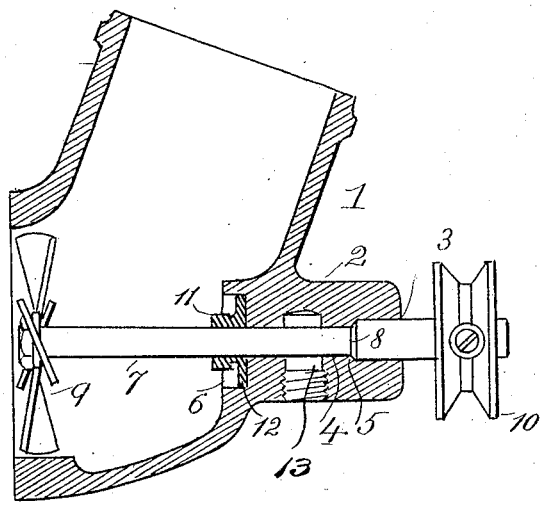
Inventor.
Charles R. Schmidt
by Connolly Bros
atty's Patented Apr. 14, 1925.

1,533,469

UNITED STATES PATENT OFFICE.

CHARLES R. SCHMIDT, OF BALTIMORE, MARYLAND.

WATER-CIRCULATING SYSTEM FOR AUTOMOBILE ENGINES.

Application filed May 11, 1923. Serial No. 638,254.

*To all whom it may concern:*

Be it known that I, CHARLES R. SCHMIDT, a citizen of the United States, residing at Baltimore, in the city of Baltimore, State of Maryland, have invented certain new and useful Improvements in Water-Circulating Systems for Automobile Engines, of which the following is a specification, reference being had therein to the accompanying drawing.

This invention has relation to water circulating means or systems for automobile engines, of that type in which the circulating of the cooling water is promoted by means of a rotating, water impelling device of the character of a winged propeller mounted on a horizontal shaft which receives motion from the fan shaft or other part of the engine by means of a belt and pulley, and is located in the usual elbow coupling between the water jacket of the engine and the radiator.

The object of this invention is to provide simple and effective means for preventing the hot water of the cooling system from displacing the lubricant of the shaft bearings and sealing the latter without the use of packing or stuffing boxes.

In practice, I have found that any soft material used as packing around a rapidly revolving shaft, will soon become glazed and hard and the vibrations of the shaft, if ever so minute, will produce sufficient space for the water to leak through both when the shaft is revolving and standing still.

As a consequence, when such packing is used for the shaft and bearings of a water circulating system, the hot water will drive the lubricant out of the bearings and a "galled" bearing will be the result, with the shaft sticking and the driving belt flying off.

To overcome this objection and difficulty, I have provided, and my invention particularly consists in the provision of specially devised and arranged ground joint bearings for the propeller shaft, one of which has conical contact surfaces, which form a fluid tight seal under the inward pull of the propeller and the other a fluid tight joint under the weight and pressure of the water in the circulating system.

A further and incidental improvement consists in the provision of means for causing the lubricant between the two joints to alternately lubricate them in turn, and grind them as consistently as the friction between the two different metal surfaces with the lubricant will permit.

The accompanying drawing is a central, vertical sectional view through the connection elbow of a water circulating system of an automobile, provided with my improvements.

1 designates the connecting elbow which is a casting formed with an integral, horizontal bearing extension, 2, bored at 3 for the reception of the propeller shaft.

The bore 3 is of uniform diameter, through the greater part of its length, as shown at 4, but is slightly increased in diameter near the outer end, and a conical shoulder 5 formed at the junction of the two sections. At the inner end, the bearing part 2 is formed with a cylindrical recess 6, of greater diameter than the bore, the bottom or back of recess being ground flat, and perpendicularly to the axis of the bore.

7 designates the propeller shaft consisting of two integral sections, of different diameters, corresponding to those of the bore of the bearing part 2 respectively, with a conical shoulder formed at 8 to seat against the conical shoulder 5 of the bore. At the inner end of this shaft is mounted the propeller 9 and, at the outer end, the pulley 10, by which the shaft is rotated.

11 designates a metallic collar which is shrunk on the shaft 7 after the latter is seated in its bearing in such a position that its enlarged flat faced disk-like portion 12 will abut against the back or bottom of the recess 6, so as to close the joint produced at that point.

When the parts are in position, as illustrated in the drawing with the conical shoulders of the shaft against the conical seat of the bearing, and the disk part of the collar 11 in contact with the back of the recess 6, the shaft will be free to rotate without longitudinal displacement.

The weight and pressure of the water against the collar 11 tending to force the shaft outwardly will closely seal the joint between the collar and the back of the recess 6, while the inward pull caused by the rotation of the propeller will maintain the conical surfaces at the shouldered portions of the shaft and bearing in fluid tight contact, so that there can be no leakage of water into, or of lubricant out of the bearing.

Lubricating material is supplied to the shaft and bearings from a suitable oil-cup, not shown, through the oil opening 13.

It will be noted that on account of the small amount of friction between the conical shoulders on the propeller shaft and shaft bearing, when the circulator is in operation, a minimum of power only is required to obtain a maximum of efficiency, and that, when the circulator is at rest, the collar or disk shrunk on the shaft exposes a large surface for the weight of the water to hold it against the seat.

I claim:

1. In a device of the class described, the combination with a bearing for a rotating shaft having a bore of two different diameters, an intervening conical shoulder and a cylindrical recess at the inner end, of a rotating shaft fitting said bore and correspondingly shouldered and a collar on said shaft and seated in said recess, the shouldered portions of the shaft and bearing and the collar being so constructed and arranged as to form fluid tight joints under the inward and outward thrusts of the shaft.

2. In a device of the class described, the combination of a bearing for a rotating shaft having a bore of a plurality of different diameters, with a shaft of a plurality of different diameters closely filling said bore, the shaft and bearing being formed with abutting shoulders between the portions of different diameters, and the shaft provided with a collar adapted to seal said bore at its inner end, said shoulder portions and said collar being constructed, arranged and adapted to form metal to metal fluid tight joints under inward and outward thrusts of the shaft.

In testimony whereof I affix my signature.

CHARLES R. SCHMIDT.